Sept. 29, 1959   G. A. LYON   2,906,559
WHEEL COVER
Filed June 28, 1955
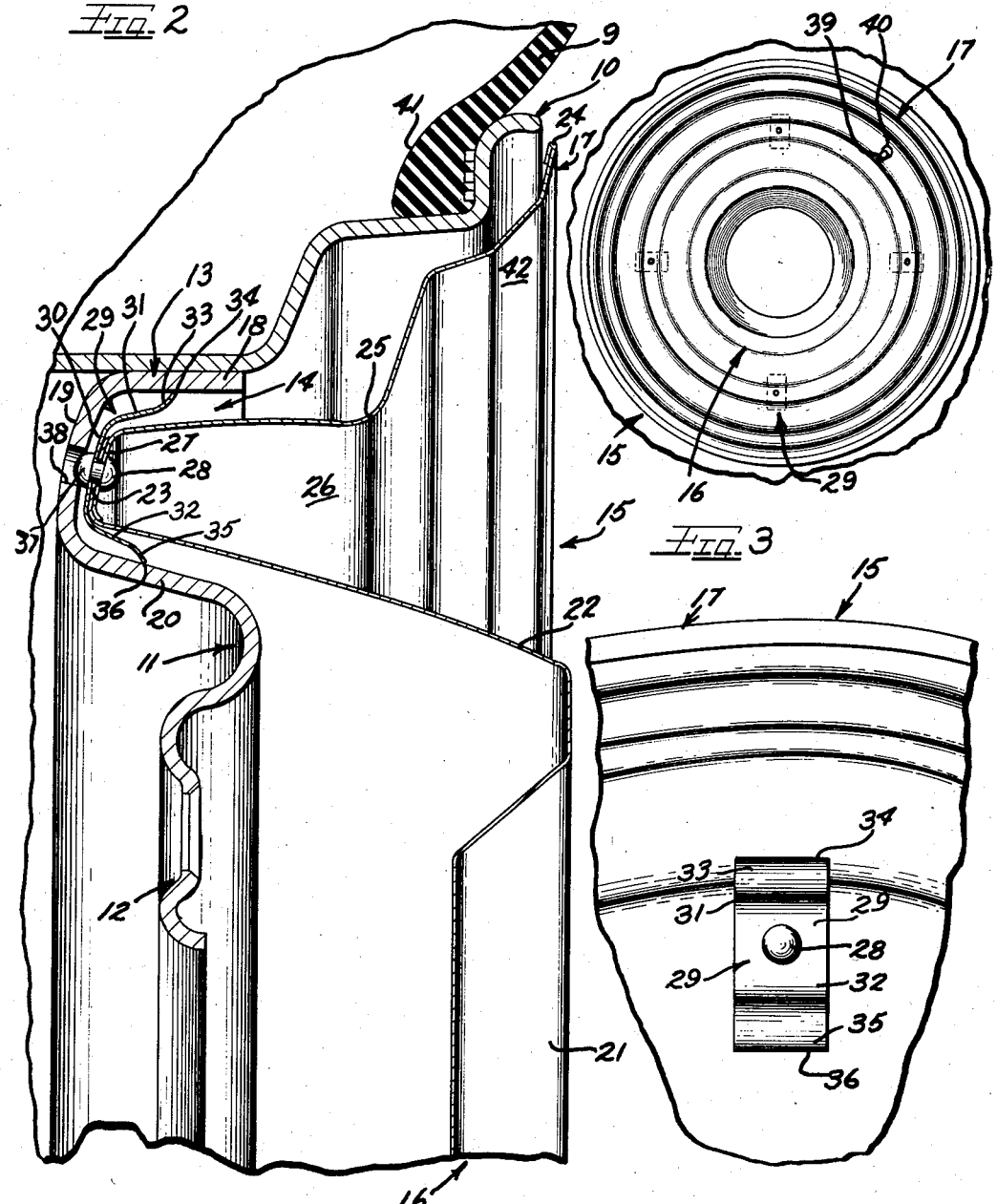
Inventor
GEORGE ALBERT LYON United States Patent Office 2,906,559
Patented Sept. 29, 1959

2,906,559

WHEEL COVER

George Albert Lyon, Detroit, Mich.

Application June 28, 1955, Serial No. 518,442

16 Claims. (Cl. 301—37)

This invention relates to wheel structures and more particularly to a wheel and cover construction wherein a cover having an unusually deep draw may be retainingly engaged upon the wheel.

At the present time in the automobile industry there is a demand for wheel covers employing an exceptionally deep draw.

It will be readily appreciated that a cover structure having a deep draw does not as readily lend itself to be manufactured in one piece. Furthermore, presently known types of retaining means are not entirely satisfactory for maintaining the cover on the wheel.

It is therefor an object of this invention to provide a novel deep draw cover construction; and more specifically, a multi-part cover construction having a deep axial draw.

Still another object of this invention is to provide retaining means which are capable of maintaining the cover on the wheel in a proper balanced firm engagement.

A further object of this invention is to provide means for the instant deep draw cover construction in order that co-rotation of the cover and wheel will be insured in assembly.

It is still another object of this invention to provide an improved wheel cover which lends itself to economical manufacture on large production basis in which it affords an entirely different ornamental look to the wheel.

Yet another object of this invention is to provide a cover wherein the retaining means may be economically secured to the cover at the junction of the two components of the cover and wherein the retaining means also serves to center the cover on the wheel.

In accordance with the general features of this invention there is provided in a wheel structure including wheel and body parts having a relatively deep axially inset depression defined by an axial flange connected at its axially inner end to an apertured radial flange which is in turn connected at its radially inner end to an axially outwardly extending flange, a cover including inner and outer cover members each having relatively deep axially extending cover portions terminating in an axial terminal for overlying engagement to define a relatively deep draw, a plurality of circumferentially spaced retaining clips including diverging resilient deflectable legs joined together by a radial leg for cover retaining engagement with the axial flanges, and means to secure the clips and overlying terminals in unitary relation and being capable of projection into the apertured radial flange in assembly to insure relative co-rotation of the cover and wheel.

Other objects and features of this invention will more fully appear from the following detailed description taken in connection with the accompanying drawings which illustrates a single embodiment thereof and in which:

Figure 1 is a fragmentary side view of a wheel structure embodying features of this invention;

Figure 2 is an enlarged fragmentary radial cross sectional view taken through the wheel structure and through one of the clips shown in dotted lines in Figure 1; and Figure 3 is a fragmentary detailed view looking at a back portion of the cover in the area of one of the retaining elements or clips.

As shown on the drawings:

The reference character 9 designates generally a pneumatic tubeless tire assembly mounted in the customary way upon a multi-flanged drop center type of tire rim 10. This tire rim 10 is of a conventional construction and is carried in the ordinary way upon a central body part or spider 11. The spider as is customary has a central bolt on flange 12 by means of which the wheel may be detachably fastened to a part on the axle of the automobile.

As is known, the tire rim 10 comprises a rolled metallic part and the spider or body part 11 comprises a metallic stamping which is suitably secured to the face of the rim part at 13.

The body part in keeping with the features of this invention is provided with an annular depression 14 adjacent the junction of the body and rim parts 10 and 11.

Cooperable with this conventional wheel assembly, with the exception of the depression 14, is a wheel cover designated generally by the reference character 15; this cover 15 includes two cooperating parts, members or portions 16 and 17 although it is to be understood that the cover could be made of one piece if it is so desired. In view of the definite draw involved in the instant cover construction, it will be appreciated that it is more economical to manufacture from two pieces than from one.

This wheel cover may be made from any suitable metallic sheet material although excellent results may be obtained by making it from stainless sheet by virtue of the fact that such material lends itself to highly desirable finishes.

The relatively deep axially extending inset depression 14 is defined by a flange 18 connected at its axially inner end to an apertured radial flange 19 which is in turn connected at its radially inner end to an axially outwardly extending flange 20 which merges into the central bolt-on flange 12. Thus, flanges 18, 19 and 20 define the axially inset depression 14.

The inner cover member 16 includes a relatively large crown 21 which merges into a generally radially outwardly and axially inwardly elongated annular side wall 22 which terminates in a generally radially outwardly extending surface or terminal 23.

The outer cover member 17 includes a terminal pry-off bead 24 and extends generally radially and axially inwardly to reinforcing rib 25. At rib 25 the cover merges with annular side wall 26 which extends deeply axially inwardly terminating in a radial terminal or surface 27. The terminals 23 and 27 are secured in unitary relation by a rivet 28.

The side walls 22 and 26 are in radially spaced relationship and define together a deep axial draw and are adapted to extend into the depression 14.

Mounted at the junction of the terminals 23 and 27 in circumferentially spaced intervals are a plurality, four as shown, of cover retaining elements or clips 29.

Each of the clips 29 includes a main radial portion 30 having at the radial opposite ends resilient deflectable legs 31 and 32. Leg 31 extends generally radially and axially outwardly terminating in an offset extremity 33 having a gripping edge 34. Leg 32 extends generally axially outwardly and radially inwardly terminating in an offset extremity 35 having a gripping edge 36. Each of the clips 29 are secured to the cover in such a manner that clip radial portion 30 is riveted at 28 with the overlying terminals 23 and 27 thereby utilizing the rivets to hold the clips 29 and cover members 16 and 17 in unitary relation.

It will be noted that rivet 28 has an axially inner portion 37 which is axially alignable with the inset shouldered aperture 38 in the body flange 19. When the cover is mounted on the wheel the rivet portion 37 extends into the inset shouldered aperture to insure relative co-rotation of the cover and wheel.

In mounting the cover on the wheel, the valve stem 39 is aligned with cover aperture 40 and the cover is urged axially inwardly with the deep draw portion of the cover projecting into the depression 14.

As the cover is urged inwardly respective edges 34 and 36 engage the lead-in camming surfaces or flanges 18 and 20 with the result that the cover is retainingly engaged upon the wheel.

It will be appreciated that by virtue of providing angled offset extremities that the legs will resist axial displacement from the wheel. Furthermore, by reason of the floating engagement between the cover and wheel, if an impact strikes the wheel the cover will tend to be urged further inwardly since the resilient legs 31 and 32 cushion the impact. When in assembled relation the rivet portion 37 extends into the inset shouldered aperture to insure relative co-rotation between the cover and wheel.

To effect removal of the cover a suitable pry-off tool may be utilized to pry the cover off the wheel. One way of disengaging the assembly is to insert a pry-off tool under the bead 24 lodging the same between the annular rim rib 41 and the cover portion 42. Thereafter, upon a twisting motion the cover may be readily dislodged.

Other modifications and variations may be effected without departing from the scope of the instant invention.

I claim as my invention:

1. In a cover structure for a wheel including a tire rim part and a supporting dished body part attached thereto, a circular wheel cover having relatively deeply drawn dished confronting portions one of which is adapted to extend over the rim part and the other of which is adapted to extend over the body part with the junction of the confronting portions for disposition in the dished area of the body part, said portions having connected to their junction resilient cover-retaining means including axially outwardly diverging resiliently deflectable gripping extensions projecting in opposite directions from the junction for retaining wedged engagement with the wheel, each of said extensions arranged in pairs and being of substantially equal length and which project axially outwardly of their junction with the cover portions.

2. In a cover structure for a wheel including a tire rim part and a supporting dished body part attached thereto, a circular wheel cover having relatively deeply drawn dished confronting portions one of which is adapted to extend over the rim part and the other of which is adapted to extend over the body part, said portions having connected to their junction resilient cover-retaining means including axially outwardly diverging resiliently deflectable gripping extensions projecting in opposite directions from the junction for retaining wedged engagement with the dished area of the body part, said clip means being secured to said junction by a transverse element for tight telescoping interlocking engagement of the wheel to hold the cover against rotation.

3. In a wheel structure including wheel and body parts having a relatively deep axially inset depression with radially spaced axial portions, a cover including connected inner and outer cover members each having relatively deeply drawn axially extending cover portions terminating in axial terminals for overlying engagement, and retaining means on said cover including diverging resilient legs radially overlying and radially underlying the cover member in radially spaced axially outwardly diverging relation to the cover portions for cover retaining engagement with the spaced axial portions when assembled on the wheel.

4. In a wheel structure including wheel and body parts having a relatively deep axially inset depression defined by an axial flange connected at its axially inner end to an apertured radial flange which is in turn connected at its radially inner end to an axially outwardly extending flange, a cover including inner and outer cover members each having a relatively deeply drawn axially extending cover portion terminating in a radial terminal for overlying engagement with one another, a plurality of circumferentially spaced retaining clips including resilient deflectable legs joined together by a radial leg for cover retaining engagement with the axial flanges, and means to secure the clips and the overlying radial terminals in unitary relation and being capable of projection into the apertured radial flange in assembly to insure relative corotation of the cover and wheel.

5. In a wheel structure including rim and body parts with the body part having a deep axially inset depression provided with radially spaced walls, a cover member having radial spaced converging axially extending cover portions defining together a relatively deeply drawn area axially alignable with the inset depression, and retaining extensions on said cover having generally axially outwardly diverging portions which are each resiliently deflectable and cammingly engageable with the radially spaced walls in cover-retaining engagement.

6. In a wheel structure including rim and body parts having an annular relatively deep axial depression defined by radially spaced walls, a cover having relatively deeply drawn axially inwardly extending cover portions defining a dished cover portion for assembly in the annular depression, clip means carried by the cover in the depression having spaced resiliently deflectable generally axially extending legs overlying and underlying the dished cover portion capable of effecting cover-retaining engagement between the cover and wheel, and means in the depression for insuring relative corotation of the cover and wheel.

7. In a wheel structure including tire and rim parts having a relatively deep depression including an inset shouldered area, a cover for disposition on the wheel including radially spaced confronting portions terminating in a radial annular portion, and clip means attached by means of rivets to said cover capable of retaining engagement with the wheel, said rivet having a portion extendable into the inset shouldered area so as to insure relative corotation of the wheel and cover in assembly.

8. In a wheel structure including junctioned rim and body parts having an annular relatively deep axial depression disposed generally radially inwardly of the junction of the parts and defined by radially spaced walls, a cover having relatively deeply drawn axially inwardly extending cover portions for assembly in the annular depression, and spaced clip means in the depression having resiliently deflectable portions capable of effecting cover-retaining engagement between the wheel and cover.

9. A wheel cover for detachable assembly with a vehicle wheel and having a dished cover portion and circumferentially spaced axially dished clip elements nested over said dished cover portion and engaged in assembly therewith, said clip element having resiliently deflectable radial extensions disposed on opposite sides of the dished cover portion axially outwardly of the bottom of the dished cover portion for retaining the cover upon a vehicle wheel.

10. In a wheel structure including rim and body parts and having generally radially spaced portions with oppositely facing surfaces, a wheel cover having a dished cover portion, and circumferentially spaced dished clip elements in assembly with the cover, the dished area of the clip and the cover being telescoped one within the other, said elements having resiliently deflectable radial extensions for camming engagement with the oppositely facing surfaces to hold the cover in detachable assembly on the wheel.

11. The wheel structure of claim 10 further characterized by said surfaces diverging axially outwardly and said elements being U-shaped with opposite ends thereof resiliently deflectable against said diverging surfaces.

12. In a wheel structure, a wheel including rim and body parts, a wheel cover for overlying disposition upon the wheel having a dished cover portion, and circumferentially spaced dished clip elements between the wheel and the cover and telescopingly nested over and bottomed on said dished cover portion, each of said elements having radially spaced axially outwardly extending resiliently deflectable portions each including a wheel engaging tip end disposed axially outwardly of the area of bottomed engagement between the elements and the dished cover portion to hold the cover in detachable assembly on the wheel.

13. In a wheel structure, a wheel having rim and body parts including a junction area where the parts are joined together and with the body part having an annular dished wheel area disposed radially inwardly of the junction area defining radially spaced radially facing wheel surfaces, a wheel cover structure having an annular dished cover area extendible into the dished wheel area and with the dished cover area including radially spaced axial side wall portions, and resiliently deflectable retaining extension portions one of which extends radially and axially outwardly of the cover and the other of which extends radially inwardly and axially outwardly of the cover, said extension portions each having tip ends disposed axially forward of the bottom of the annular dished area and which tip ends are engageable with the radially spaced radially facing wheel surfaces on opposite sides of the annular dished cover areas to secure the cover structure on the wheel.

14. In a wheel structure, a wheel having rim and body parts including a junction area where the parts are joined together and with the body part having an annular dished wheel area disposed radially inwardly of the junction area defining radially spaced radially facing wheel surfaces, a wheel cover structure having an annular dished cover area extendible into the dished wheel area and with the dished cover area including radially spaced axial side wall portions, and resiliently deflectable clip structure interposed between the dished wheel area and the dished cover area for securing the cover in removable assembly with the body part of the wheel, said clip structure including resiliently deflectable clip portions extending axially outwardly of the bottom of the dished cover area in underlying and overlying relation to the dished cover area on radially opposite sides thereof to sustain the cover on the wheel.

15. In a wheel structure, a wheel having rim and body parts including a junction area where the parts are joined together and with the body part having an annular dished wheel area disposed radially inwardly of the junction area defining radially spaced radially facing wheel surfaces, a wheel cover structure having an annular dished cover area extendible into the dished wheel area and with the dished cover area including radially spaced axial side wall portions, said cover structure including a circular disc and a ring with the disc and ring having lapped portions defining the bottom of the dished cover area, and resiliently deflectable clip structure interposed between the dished wheel area and the dished cover area for securing the cover in removable assembly with the body part of the wheel, said clip structure including resiliently deflectable clip portions extending axially outwardly of the bottom of the dished cover area in underlying and overlying relation to the dished cover area on radially opposite sides thereof to sustain the cover on the wheel, said clip structure including circumferentially spaced clips, and means not only securing the clips to the cover structure but which also secures the lapped cover portions in assembly together.

16. In a wheel structure including junctioned rim and body parts having an annular relatively deep axial depression disposed generally radially inwardly of the junction of the parts and defined by radially spaced walls, a cover having relatively deeply drawn axially inwardly extending cover portions for assembly in the annular depression and retaining extensions carried by the cover in the depression each having radially spaced resiliently deflectable legs cooperable with the walls capable of effecting cover-retaining engagement between the wheel and cover.

References Cited in the file of this patent

UNITED STATES PATENTS

| 2,421,756 | Lyon | June 10, 1947 |
| 2,683,629 | Lyon | July 13, 1954 |

FOREIGN PATENTS

| 487,724 | Canada | Nov. 4, 1952 |